United States Patent
Nica et al.

(10) Patent No.: US 11,734,258 B2
(45) Date of Patent: *Aug. 22, 2023

(54) CONSTRAINT DATA STATISTICS

(71) Applicant: SAP SE, Walldorf (DE)

(72) Inventors: Anisoara Nica, Waterloo (CA); Reza Sherkat, Waterloo (CA); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,608

(22) Filed: Apr. 1, 2022

(65) Prior Publication Data

US 2022/0222244 A1    Jul. 14, 2022

Related U.S. Application Data

(63) Continuation of application No. 15/796,326, filed on Oct. 27, 2017, now Pat. No. 11,468,035.

(Continued)

(51) Int. Cl.
*G06F 16/23* (2019.01)
*G06F 16/21* (2019.01)
(Continued)

(52) U.S. Cl.
CPC ........ *G06F 16/2365* (2019.01); *G06F 16/211* (2019.01); *G06F 16/217* (2019.01);
(Continued)

(58) Field of Classification Search
CPC ............... G06F 16/2365; G06F 16/217; G06F 16/24545; G06F 16/2282; G06F 16/211; G06F 16/278; G06F 16/2462; G06F 16/27

See application file for complete search history.

(56) References Cited

U.S. PATENT DOCUMENTS 6,453,314 B1    9/2002    Chan et al.
9,519,676 B1    12/2016    Finnie et al.
(Continued)

FOREIGN PATENT DOCUMENTS

WO    2014000785 A1    1/2014

OTHER PUBLICATIONS

Oracle Database Peformance Tuning Guide, 10g Release 2 (10.2), Mar. 2008, Chapter 14 "Managing Optimizer Statistics" https://web.archive.org/web/20111119194542/http://docs.oracle.com/cd/B19306_01/server.102/b14211.pdf (Year: 2008).*

(Continued)

*Primary Examiner* — Allen S Lin
(74) *Attorney, Agent, or Firm* — Sterne, Kessler, Goldstein & Fox P.L.L.C.

(57) ABSTRACT

Disclosed herein are system, method, and computer program product embodiments for using a data statistic as a dynamic data integrity constraint. An embodiment operates by defining a data statistic for a column or a set of columns of a partition of a plurality of partitions of a database table. The embodiment creates a constraint data statistics object based on the data statistic. The embodiment receives a query for the database table. The embodiment determines the constraint data statistics object is consistent with a data state of the partition. The embodiment derives an implied constraint based on the constraint data statistics object. The embodiment processes the query for the partition based on the implied constraint.

20 Claims, 7 Drawing Sheets

Related U.S. Application Data

(60) Provisional application No. 62/505,485, filed on May 12, 2017.

(51) Int. Cl.
   | | |
   |---|---|
   | *G06F 16/27* | (2019.01) |
   | *G06F 16/22* | (2019.01) |
   | *G06F 16/2458* | (2019.01) |
   | *G06F 16/2453* | (2019.01) |

(52) U.S. Cl.
   CPC ...... *G06F 16/2282* (2019.01); *G06F 16/2462* (2019.01); *G06F 16/24545* (2019.01); *G06F 16/278* (2019.01)

(56) References Cited

U.S. PATENT DOCUMENTS

| | | | |
|---|---|---|---|
| 2003/0084025 A1* | 5/2003 | Zuzarte | G06F 16/2462 |
| 2014/0149360 A1 | 5/2014 | Dieckmann et al. | |
| 2015/0032707 A1 | 1/2015 | Barykin et al. | |
| 2015/0106407 A1 | 4/2015 | Adayilamuriyil et al. | |
| 2015/0120698 A1 | 4/2015 | Plattner et al. | |
| 2016/0350375 A1 | 12/2016 | Das et al. | |
| 2017/0293649 A1* | 10/2017 | Finlay | G06F 16/215 |
| 2018/0004829 A1* | 1/2018 | Kathuria | G06F 16/2379 |
| 2018/0203807 A1 | 7/2018 | Krueger | |
| 2018/0285418 A1 | 10/2018 | Petropoulos et al. | |
| 2018/0329941 A1 | 11/2018 | Nica et al. | |
| 2018/0329973 A1 | 11/2018 | Sherkat et al. | |
| 2018/0329974 A1 | 11/2018 | Bensberg et al. | |

OTHER PUBLICATIONS

Search Report for European Patent Application No. 18171431.2-1231, dated Sep. 25, 2018, 6 pages.

Communication pursuant to Article 94(3) EPC, for European Patent Application No. 18171431.2-1231, dated May 25, 2021, 7 pages.

Agrawal, S. et al., Integrating Vertical and Horizontal Partitioning into Automated Physical Database Design, SIGMOD 2004, pp. 359-370, Jun. 13-18, 2004.

Alexiou, K. et al., "Adaptive Range Filters for Cold Data: Avoiding Trips to Siberia," Proceedings of the VLDB Endowment, vol. 6, No. 14, pp. 1714-1725, Aug. 26-30, 2013.

Chandramoull, B. et al., "READY: Completeness is in the Eye of the Beholder," 8th Biennial Conf. on Innovative Data Systems Research, 11 pages, Jan. 8-11, 2017.

Chaudhuri, S. et al., "Automating Statistics Management for Query Optimizers," ICDE, 10 pages, 2000.

Curino, C. et al., "Schism: a Workload-Driven Approach to Database Replication and Partitioning," Proceedings of the VLDB Endowment, vol. 3, No. 1, 10 pages, Sep. 13-17, 2010.

D'Costa, A. et al., "Data Statistics Adviser in Database Management Systems," SIGMOD Student Research Competition 2017, pp. 4-6, May 14-19, 2017.

Dageville, B. et al., "The Snowflake Elastic Data Warehouse," SIGMOD/PODS '16, pp. 215-226, Jun. 26-Jul. 1, 2016.

Deutsch, A. et al., "Query Reformulation with Constraints," ACM SIGMOD Record, vol. 35, No. 1, pp. 65-73, Mar. 2006.

El-Helw, A. et al., "Collecting and Maintaining Just-in-Time Statistics," ICDE, 10 pages, 2007.

Fan, W. "Dependencies Revisited For Improving Data Quality,", ACM PODS, pp. 159-170, Jun. 9-12, 2008.

Fan, W. et al., "Discovering Conditional Functional Dependencies," IEEE Trans. Knowl. Data Eng., vol. 23, No. 5, pp. 1-15, 2011.

Färber, F. et al., "The SAP HANA Database—An Architecture Overview," Bulletin of the IEEE Computer Society Technical Committee on Data Engineering, vol. 35, No. 1, 6 pages, 2012.

Finkelstein, S. et al., "Physical Database Design for Relational Databases," ACM Transactions on Database Systems, vol. 13, No., pp. 91-128, Mar. 1988.

Graefe. G., "Fast Loads and Fast Queries," Data Warehousing and Knowledge Discovery 2009, pp. 111-124, Aug. 31-Sep. 2, 2009.

Grund, M. et al., "HYRISE—A Main Memory Hybrid Storage Engine," Proceedings of the VLDB Endowment, vol. 4, No. 2, 2010.

Gupta, D. et al., "Amazon Redshift and the Case for Simpler Data Warehouses," SIGMOD '15, pp. 1917-1923, May 31-Jun. 2015.

Hankins, R. et al., "Data Morphing: An Adaptive, Cache-Conscious Storage Technique," Proceeding of the 29th VLDB Conference, 12 pages, 2003.

Herodotou, H. et al., "Query Optimization Techniques for Partitioned Tables," SIGMOD'11. 12 pages, Jun. 12-16, 2011.

Lins, L. et al., "Nanocubes for Real-Time Exploration of Spatiotemporal Datasets," IEEE Transactions on Visualization and Computer Graphics, vol. 19, No. 12, 10 pages, 2013.

Moerkotte, G., et al., "Small Materialized Aggregates: A Light Weight Index Structure for Data Warehousing," Proceedings of the 24th VLDB Conference, pp. 476-487, 1998.

Moerkotte, G. et al., Exploiting Ordered Dictionaries to Efficiently Construct Histograms with Q-Error Guarantees in SAP HANA, SIGMOD'14, pp. 361-372, Jun. 22-27, 2014.

Nacathe, S. et al., "Vertical Partitioning Algorithms for Database Design," ACM Trans. on Database Systems, vol. 9., No. 4, pp. 680-710, Dec. 1984.

Nica, A. et al., "Statisticum: Data Statistics Management in SAP HANA," Proceedings of the VLDB Endowment, vol. 10, No. 7, 12 pages, 2017.

Pedreira, P. et al., "Cubrick: Indexing Millions of Records per Second for Interactive Analytics," Proceedings of the VLDB Endowment, vol. 9, No. 13, 2016.

Rahm, E., "Towards Large-Scale Schema and Ontology Matching," Schema Matching and Mapping, pp. 3-27, Springer-Verlag, 2011.

Sherkat, R. et al., "Page As You Go: Piecewise Columnar Access in Sap HANA," SIGMOD'16, pp. 1295-1306, Jun. 26-Jul. 1, 2016.

Sikka, V. et al., "Efficient Transaction Processing in SAP HANA Database—The End of a Column Store Myth," SIGMOD '12, pp. 731-741, May 20-24, 2012.

Sun, L. et al., "Fine-grained Partitioning for Aggressive Data Skipping," SIGMOD'14, 12 pages, Jun. 22-27, 2014.

Sun, L. et al., "Skipping-oriented Partitioning for Columnar Layouts," Proceedings of the VLDB Endowment, 1vol. 10, No. 4, pp. 421-432, 2016.

TPC, printed Jan. 15, 2020, from http://www.tpc.org/tpch/, 1 page, Copyright 1998-2020 TPC.

Oracle Database Peformance Tuning Guide, 10g Release 2 (10.2), Mar. 2008, Chapter 14, 19 "Managing Optimizer Statistics" https://web.archive.org/web/20111119194542/http://docs.oracle.com/ed/B19306_01/server.102/b14211.pdf (Year: 2008).

* cited by examiner

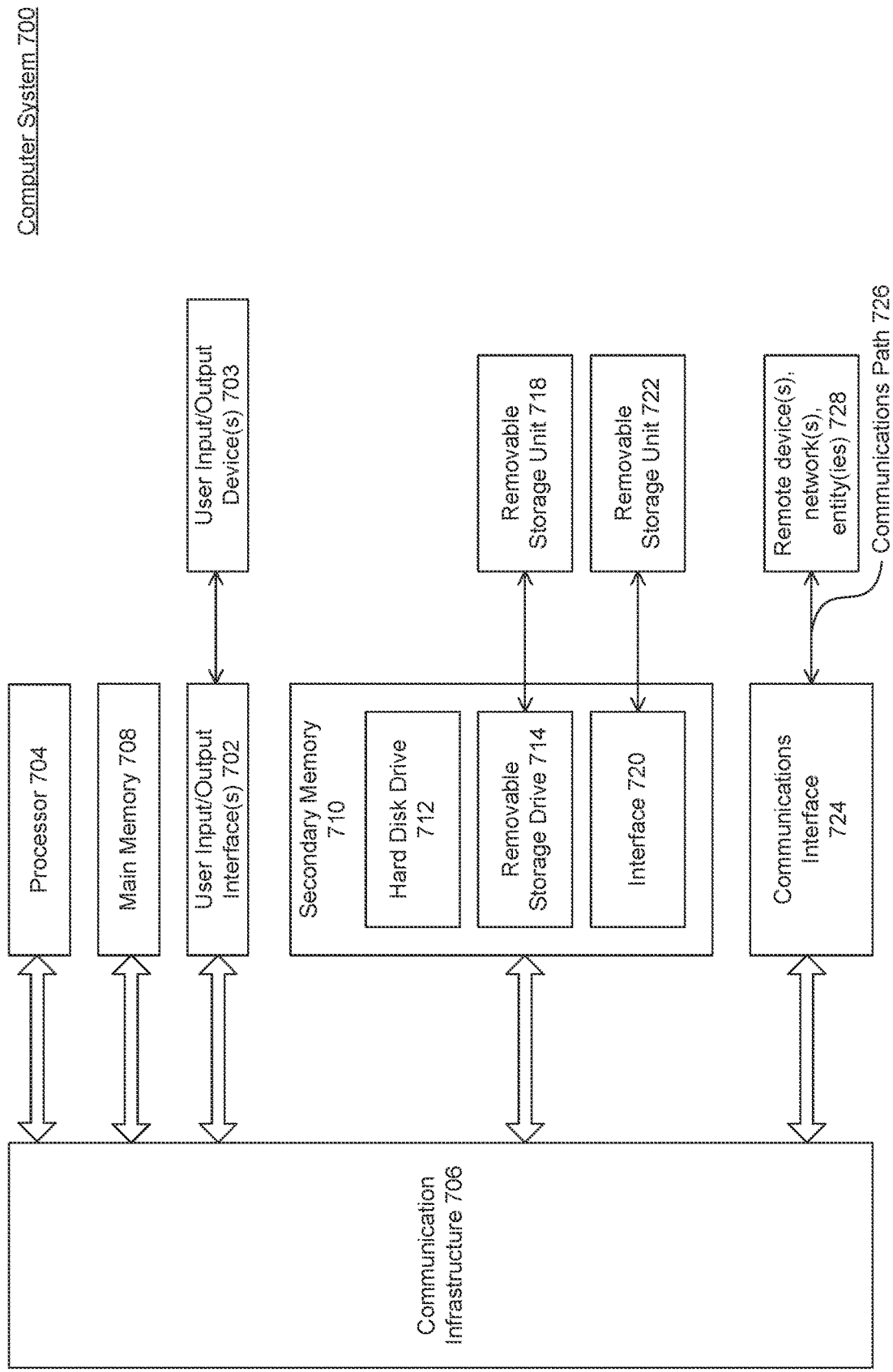

CONSTRAINT DATA STATISTICS

CROSS-REFERENCE TO RELATED APPLICATION

This application is a continuation of U.S. patent application Ser. No. 15/796,326, filed Oct. 27, 2017, now allowed, which claims the benefit of provisional U.S. Patent Application No. 62/505,485, titled "Data Statistics As Data Integrity Constraints In A Database Management System" filed on May 12, 2017, all of which are incorporated herein by reference in their entirety.

BACKGROUND

Background

A database management system (DBMS) often applies data integrity constraints during query processing to improve query processing time and reduce memory consumption. For example, a DBMS may use partition constraints to perform partition pruning during query processing.

In partition pruning, a database administrator may define partition constraints for a database table using Data Definition Language (DDL) commands. The DBMS may use the partition constraints to create physically independent partitions for the database table. This may enable the DBMS to avoid scanning, and loading into main memory, one or more irrelevant partitions of the database table in response to a query. Partition pruning may improve query processing time and reduce memory consumption.

For example, a database administrator may partition an ORDERS database table containing a historical record of orders by year. The DBMS may then process a query for orders made in a particular time period by skipping partitions irrelevant to the query.

A DBMS may further improve query processing time and reduce memory consumption by applying a dynamic data integrity constraint during query processing. A dynamic integrity constraint may describe a snapshot of the database state such as data location and system topology.

For example, a DBMS may apply a dynamic data integrity constraint that partitions a database table into a hot partition containing recently accessed data and one or more cold partitions containing data that has not been recently accessed. The DBMS may store the hot partition in a fast, low latency storage such random access memory (RAM). This is because the DBMS expects the hot partition to be more frequently accessed than the one or more cold partitions. The DBMS may store the one or more cold partitions in a slower, higher latency storage device such as hard disk drive. This partitioning scheme may enable the DBMS to scan and process a smaller amount of data.

For example, in response to a query for a recently accessed data record, the DBMS may scan and process the data record in the hot partition from the fast, low latency storage and skip the one or more cold partitions that are irrelevant to the query. This dynamic partition pruning process may improve query processing time and reduce memory consumption because the DBMS does not need to scan, or load into main memory, the one or more cold partitions.

But a DBMS often does not utilize dynamic data integrity constraints to improve query processing time and reduce memory consumption. This is because dynamic data integrity constraints are often expensive to discover and maintain for a DBMS.

BRIEF DESCRIPTION OF THE DRAWINGS

The accompanying drawings are incorporated herein and form a part of the specification.

FIG. 7 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for using traditional data statistics as dynamic data integrity constraints. Provided herein are system, apparatus, device, method and/or computer program product embodiments, and/or combinations and sub-combinations thereof, for determining that a traditional data statistic is consistent with a data state of a database. Provided herein are system, apparatus, device, method and/or computer program product embodiments, and/or combinations and sub-combinations thereof, for performing dynamic partition pruning using traditional data statistics.

Figure 1:
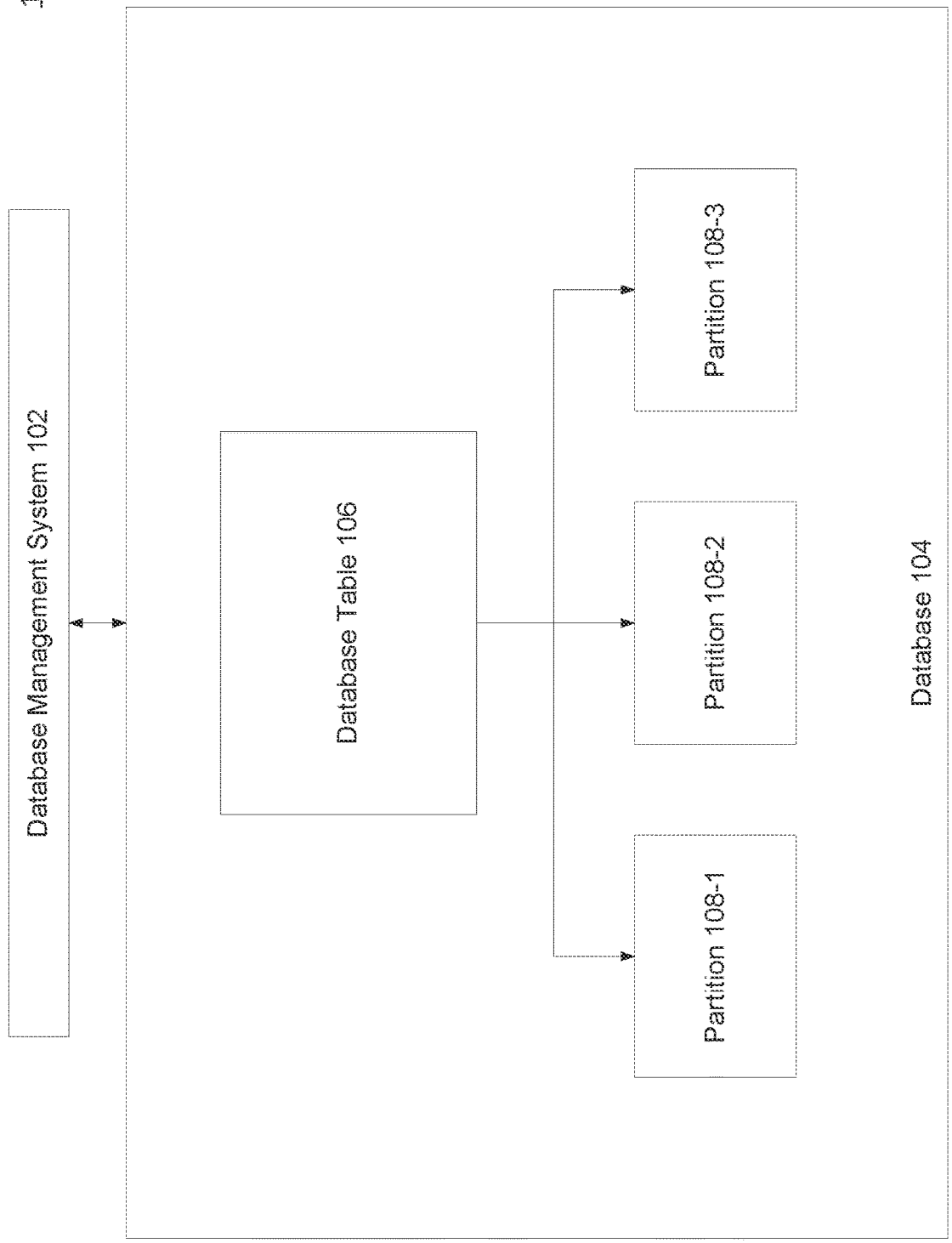
FIG. 1 is a block diagram of a database system that uses traditional data statistics as dynamic data integrity constraints, according to some embodiments.

FIG. 1 illustrates a database system 100 that uses traditional data statistics as dynamic data integrity constraints, according to an example embodiment. For example, FIG. 1 illustrates using constraint data statistics objects as dynamic data integrity constraints. FIG. 1 further illustrates performing dynamic partition pruning using constraint data statistics objects. As would be appreciated by a person of ordinary skill in the art, database system 100 may also use constraint data statistics objects as dynamic data integrity constraints to perform query optimization, semi-join reduction optimization, query transformation, or other various other types of operations.

In some embodiments, database system 100 includes a database management system 102 and a database 104. Database management system 102 may be a collection of computer software programs that control the organization, storage, and retrieval of data in database 104. A request to query, insert, or update data in database 104 may be performed as a database transaction by database management system 102.

In some embodiments, database 104 may be a relational database. A relational database may organize data as a set of database tables from which data can be accessed or reassembled in different ways without having to reorganize the database tables.

For example, in some embodiments, database 104 includes database table 106. Database table 106 may contain one or more data categories in columns. Each row may contain a unique instance of data for the categories defined by the columns. For example, a business order entry database may include a table that describes a customer with columns for name, address, phone number, and so forth. Each row may have a primary key. A primary key may be a column, or combination of columns, designated to uniquely identify a row.

In some embodiments, database table 106 may be represented using either row-based storage or column-based storage. In row-based storage, database management system 102 may store data in database table 106 row by row. In column-based storage, database management system 102 may store data in database table 106 column by column.

In some embodiments, database management system 102 may apply a dynamic data integrity constraint during query processing to improve query processing time and reduce memory consumption. A dynamic data integrity constraint may describe a snapshot of a data state of database 104 such as data location and system topology. For example, database management system 102 may use a dynamic data integrity constraint to restrict access to infrequently used data (e.g., cold data) that is not relevant to a query. But a dynamic data integrity constraint is often expensive to discover and maintain for database management system 102. This may reduce the usage of a dynamic data integrity constraint by database management system 102.

In some embodiments, database management system 102 may also improve performance using traditional data statistics. But traditional data statistics can also be expensive to create and maintain when data changes.

However, in some embodiments, database management system 102 may efficiently create and maintain traditional data statistics using data statistics objects. A data statistics object may track a data statistic in database 104. For example, many commercial database management systems (e.g., SAP HANA) may have support for data statistics objects.

In some embodiments, database management system 102 may build and maintain data statistics objects. For example, database management system 102 may update the data statistics objects when data changes. Database management system 102 may also provide an application programming interface (API) for answering statistical questions of the data statistic objects.

In some embodiments, building and maintaining data statistics objects is similar to discovering and maintaining dynamic data integrity constraints. Moreover, in some embodiments, a data statistics object may have an implied dynamic data integrity constraint associated with it. For example, database management system 102 may extract data as a two bucket histogram from a column A of database table 106 as [10, 100, payload1] and [200, 300, payload2]. This may imply a dynamic data integrity constraint of (column A of database table 106 between 10 and 100) or (column A of database table 106 between 200 and 300). Moreover, in some embodiments, the data statistics object may imply a new dynamic data integrity constraint when database management system 102 rebuilds the data statistics object.

In some embodiments, database management system 102 may use a data statistics object as a dynamic data integrity constraint based on the observation that the data statistics object may imply a dynamic data integrity constraint. In some embodiments, this type of data statistics object may be referred to as a constraint data statistics object.

In some embodiments, a constraint data statistics object is a special type of data statistics object. A database administrator may define a constraint data statistics object. A constraint data statistics object may leverage a traditional data statistic as an implied dynamic data integrity constraint.

In some embodiments, the implied dynamic data integrity constraint may be defined for a column of a partition of database table 106. For example, the constraint data statistics object may have an implied dynamic data integrity constraint that is defined as a (minimum, maximum) value pair for a column of a partition of database table 106. The minimum value of the pair may represent the smallest value in the column of the partition of database table 106. The maximum value of the pair may represent the largest value in the column of the partition of database table 106. As would be appreciated, the implied dynamic data integrity constraint may be defined in various other ways for database table 106 (e.g., for a column of database table 106).

In some embodiments, database management system 102 may use a constraint data statistics object to improve query processing time and reduce memory consumption by applying its associated implied dynamic data integrity constraint during query processing. For example, in some embodiments, when database management system 102 receives a query, database management system 102 may determine a constraint data statistics object associated with the query. Database management system 102 may then determine whether a dynamic data integrity constraint of the constraint data statistics object is consistent with a data state of database 104. If the constraint data statistics object is consistent with the data state of database 104, then database management system 102 may compare the query against the dynamic data integrity constraint of the constraint data statistics object.

FIG. 1 further illustrates performing dynamic partition pruning using constraint data statistics objects. However, as would be appreciated by a person of ordinary skill in the art, database system 100 may also use constraint data statistics objects as dynamic data integrity constraints to perform query optimization, semi-join reduction optimization, query transformation, or other various other types of operations.

In some embodiments, database management system 102 may perform dynamic partition pruning using constraint data statistics objects in order to reduce memory consumption and query processing time. For example, in some embodiments, database management system 102 may partition database table 106 into a partition 108-1 containing recently accessed data, and partitions 108-2 and 108-3 containing data that has not been recently accessed.

In some embodiments, database management system 102 may partition database table 106 into partitions 108-1, 108-2, and 108-3 using a range of values (e.g., range partitioning). However, as would be appreciated by a person of ordinary skill in the art, database management system 102 may partition database table 106 into partitions 108-1, 108-2, and 108-3 using various other partition criterion, e.g., hash partitioning. Moreover, as would be appreciated by a person of ordinary skill in the art, database management system 102 may partition database table 106 into various numbers of partitions based on a partition criterion.

In some embodiments, database management system 102 may store partitions 108-1 to 108-3 on a same physical database node. In some other embodiments, database management system 102 may store partitions 108-1 to 108-3 across several database nodes.

In some embodiments, database management system 102 may store partition 108-1 (e.g., a hot partition) in a fast, low latency storage (e.g., random access memory (RAM)) because database management system 102 expects partition 108-1 to be more frequently accessed than partitions 108-2 and 108-3 (e.g., cold partitions). Database management system 102 may store partitions 108-2 and 108-3 in a slower, higher latency storage device such as hard disk drive.

In some embodiments, in response to a query for a recently accessed data record, database management system 102 may scan and process the data record in partition 108-1 from the fast, low latency storage and skip partitions 108-2 and 108-3 that are irrelevant to the query. Therefore, database management system 102 performance of dynamic partition pruning using constraint data statistics objects may improve query processing time and reduce memory consumption because database management system 102 does not need to scan, or load into main memory, partitions 108-2 and 108-3.

In some embodiments, database management system 102 may perform dynamic partition pruning using constraint data statistics objects similarly to static partition pruning. In some embodiments, for example, database management system 102 may compare a predicate of a query on a column of database table 106 against an implied dynamic data integrity constraint of a constraint data statistics object describing data in the column for one of partition 108-1, 108-2, or 108-3, as well as the state of the data when the statistics objects where last built. Database management system 102 may prune or skip the partition if the predicate of the query on the column of database table 106 is disjoint with the implied dynamic data integrity constraint describing the data in the column of the partition.

In some embodiments, database management system 102 may perform dynamic partition pruning on database table 106 using one set of primary columns of database table 106. In some embodiments, database management system 102 may also perform dynamic partition pruning on database table 106 after static partition pruning.

Figure 2:
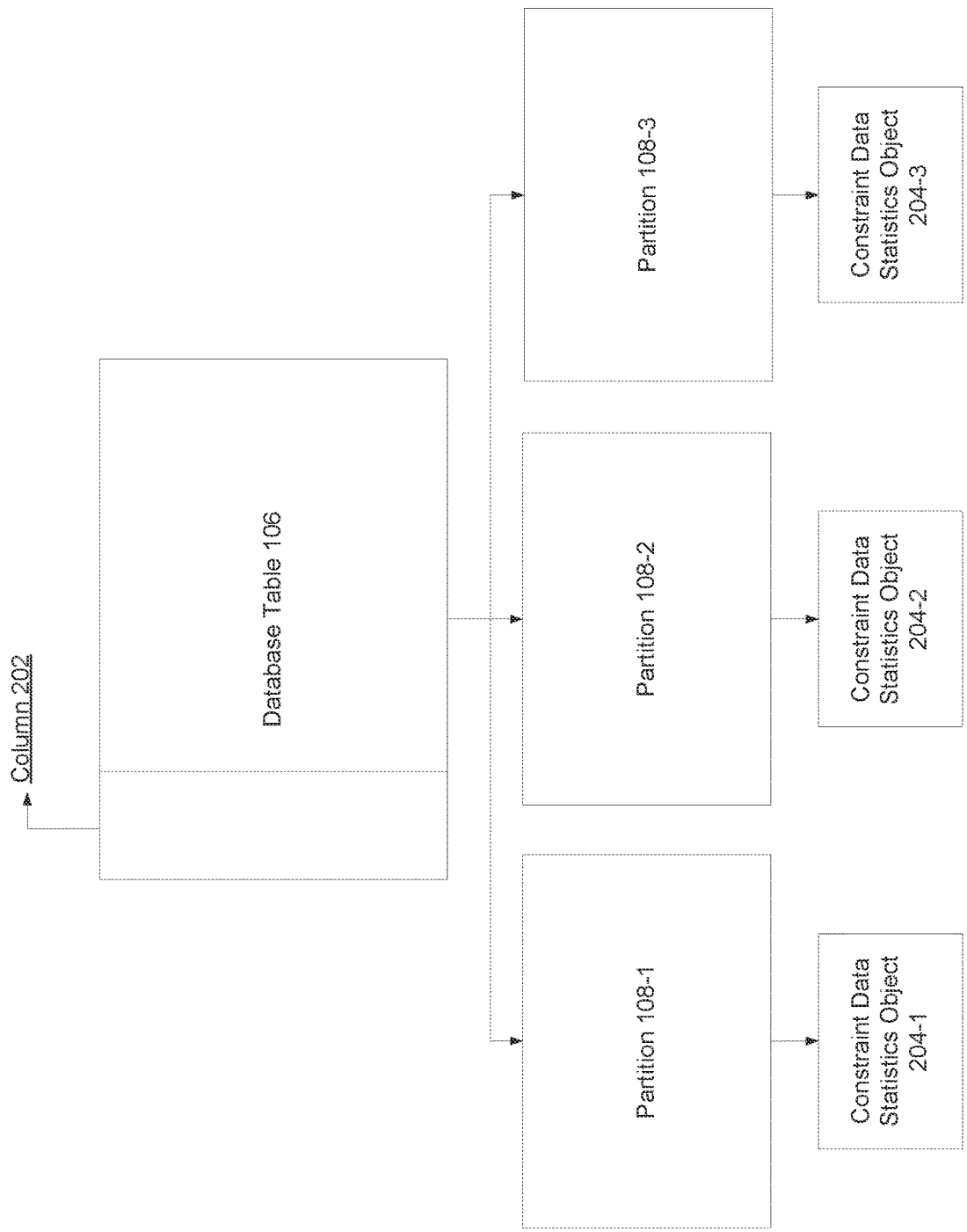
FIG. 2 illustrates a database table with dynamic partition pruning using constraint data statistics objects, according to some embodiments.

FIG. 2 illustrates database table 106 with dynamic partition pruning using constraint data statistics objects, according to an example embodiment. As discussed, database management system 102 may partition database table 106 into partitions 108-1, 108-2, and 108-3.

In some embodiments, database management system 102 partitions database table 106 based on a partition criterion for column 202. For example, in some embodiments, database management system 102 may partition database table 106 based on a range of values in column 202. As would be appreciated by a person of ordinary skill in the art, database management system 102 may partition database table 106 based on various other partition criterion. Moreover, as would be appreciated by a person of ordinary skill in the art, database management system 102 may partition various other database objects (e.g., a database index) for various other dimensions (e.g., row).

In some embodiments, partitions of partition database table 106 may reside on a single server in database system 100. In some other embodiments, different partitions of partition database table 106 may reside on different servers in database system 100. In some other embodiments, a partition of partition database table 106 may reside on a server in database system 100 and another partition of partition database table 106 may reside on an extended storage system in database system 100.

In some embodiments, database management system 102 may create a constraint data statistics object 204 to represent a range of values for column 202 of each partition 108. For example, database management system 102 may create constraint data statistics object 204-1 for partition 108-1, constraint data statistics object 204-2 for partition 108-2, and constraint data statistics object 204-3 for partition 108-3.

In some embodiments, database management system 102 may perform dynamic partition pruning using one or more of constraint data statistics object 204-1, constraint data statistics object 204-2, and constraint data statistics object 204-3. In some embodiments, database management system 102 may determine that an implied dynamic data integrity constraint of one (or more than one) of constraint data statistics object 204-1, constraint data statistics object 204-2, and constraint data statistics object 204-3 is consistent with a data state of database 104 prior to performing a query. For example, database management system 102 may determine that the implied dynamic data integrity constraint of constraint data statistic 204-1 reflects current data for column 202 in partition 108-1 for database table 106.

For example, in some embodiments, if database management system 102 determines the implied dynamic data integrity constraint of constraint data statistics object 204-1 reflects current data state for column 202 in partition 108-1 for database table 106, database management system 102 may prune or skip partition 108-1 if a predicate of the query on column 202 of database table 106 is disjoint with the implied dynamic data integrity constraint of constraint data statistic 204-1 describing the data in column 202 of partition 108-1.

In some embodiments, if database management system 102 determines the implied dynamic data integrity constraint of constraint data statistic 204-1 does not reflect current data state (e.g., is inconsistent) for column 202 in partition 108-1 for database table 106, database management system 102 may update the implied dynamic data integrity constraint of constraint data statistic 204-1 based on the current data in partition 108-1. In some embodiments, if database management system 102 determines there is a data change to partition 108-1, database management system 102 may update the implied dynamic data integrity constraint of constraint data statistic 204-1 based on the current data in partition 108-1. In some embodiments, database management system 102 may update the implied dynamic data integrity constraint immediately. In some other embodiments, database management system 102 may schedule the update of the implied dynamic data integrity constraint for a later time (e.g., asynchronously).

Figure 3:
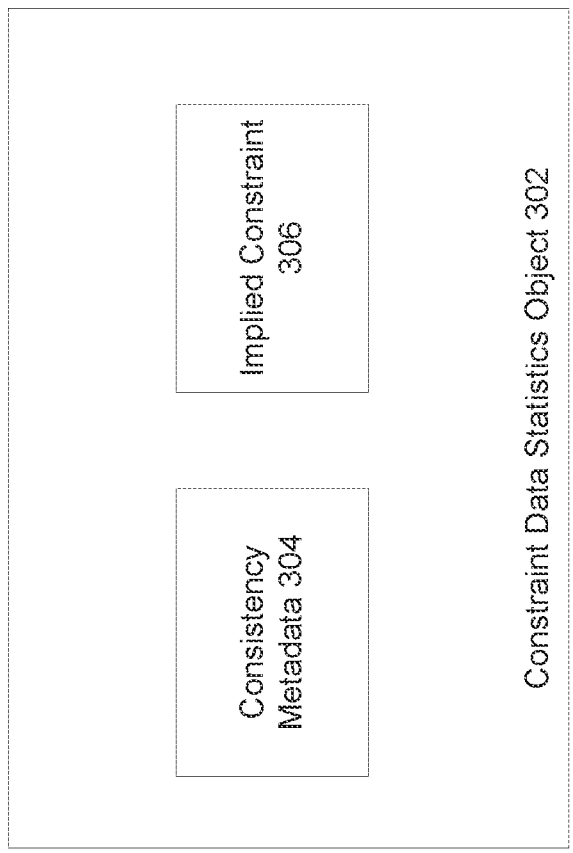
FIG. 3 is a block diagram of a constraint data statistics object, according to some embodiments.

FIG. 3 is a block diagram of a constraint data statistics object 302, according to an example embodiment. Constraint data statistics object 302 may represent one of constraint data statistics object 204-1, constraint data statistics object 204-2, and constraint data statistics object 204-3 in FIG. 2. FIG. 3 is discussed with reference to, and without limitation to, FIGS. 1 and 2. In some embodiments, constraint data statistics object 302 may include consistency metadata 304 and implied constraint 306. Implied constraint 306 may represent an implied data integrity constraint for column 202 of a partition 108 of database table 106. In some other embodiments, constraint data statistics object 302 may include implied constraint 306 but not consistency metadata 304.

In some embodiments, database management system 102 may determine whether an implied constraint 306 reflects current data for column 202 in a partition 108 for database table 106 at a given database snapshot. In other words, database management system 102 determines whether implied constraint 306 is consistent with a data state of column 202 in a partition 108 in database 104 at a given database snapshot. Database management system 102 may determine the consistency of implied constraint 306 to determine whether it can use implied constraint 306 during a query execution. This ensures that database management system 102 is performing optimizations leveraging the integrity constraint (e.g. dynamic partition pruning) using accurate data.

In some embodiments, database management system 102 may determine whether implied constraint 306 is consistent by building and maintaining a version of constraint data statistics object 302 per database snapshot. In some embodiments, an instantiation of a constraint data statistics object 302 may be referred to as a synopsis. In some embodiments, a synopsis may have content representing a data statistic, and thus implied constraint 306. In some embodiments, a synopsis may also have consistency metadata 304.

In some embodiments, database management system 102 may determine whether implied constraint 306 is consistent by selecting a version of constraint data statistics object 302 associated with the database snapshot of a query to be performed. Database management system 102 may then determine whether a predicate of the query is disjoint with the implied constraint 306 of the selected constraint data statistics object 302.

In some embodiments, however, maintaining a version of constraint data statistics object 302 (e.g., synopsis) per database snapshot is expensive. This is because extra storage may be required to store each version of constraint data statistics object 302 per database snapshot. Moreover, extra effort may be required to maintain the freshness of each constraint data statistics object 302 per operation that may invalidate the constraint data statistics object 302 in the corresponding snapshot. In addition, database management system 102 may need to perform additional processing to select the appropriate constraint data statistics object 302 at a given database snapshot that wants to use a constraint data statistics object for performance improvement.

In some embodiments, database management system 102 may instead determine whether implied constraint 306 is consistent by augmenting constraint data statistics object 302 with consistency metadata 304. In some embodiments, database management system 102 may use consistency metadata 304 to decide if constraint data statistics object 302 is consistent at a given database snapshot for a query. In some embodiments, the inclusion of consistency metadata 304 in constraint data statistics object 302 means that a separate version of constraint data statistics objects 302 does not need to be maintained per database snapshot.

In some embodiments, database management system 102 may use consistency metadata 304 because it adds no extra cost to operations that modify column content (e.g., data of column 202). In addition, database management system 102 may use consistency metadata 304 because it allows low verification overhead of implied constraint 306 (e.g., data statistic consistency) with the current state of a column (e.g., column 202) of a partition (e.g., partition 108) of a database table (e.g., database table 106).

In some embodiments, consistency metadata 304 of constraint data statistics object 302 may include a MaxRowID value. In some embodiments, the MaxRowID value may be the maximum of the largest row identifier of a partition (e.g., partition 108) of database table 106 at a given time. In some embodiments, database management system 102 may store a MaxRowID value with each partition (e.g., partition 108) for database table 106. In some embodiments, database management system 102 may increment the MaxRowID value of each partition (e.g., partition 108) for database table 106 when a row is inserted into (or updated in) the partition. Thus, the MaxRowID value of the partition may represent the physical state of the partition with no extra cost because it is an existing piece of information that database management system 102 manages for each partition.

In some embodiments, database management system 102 may determine whether implied constraint 306 is consistent with a data state of database 104 by comparing the MaxRowID value of consistency metadata 304 against the current MaxRowID of partition 108. In some embodiments, if database management system 102 determines the MaxRowID value of consistency metadata 304 is equal to the MaxRowID value of the partition 108, database management system 102 may decide that implied constraint 306 (e.g., the data statistic of constraint data statistic 302) is consistent with a data state for a query (e.g., a requesting transaction database state) with the snapshot in which the query is executed. However, if database management system 102 determines the MaxRowID value of consistency metadata 304 is greater than the MaxRowID value of the partition 108, database management system 102 may not be able to decide if implied constraint 306 is consistent with the data state for the query (e.g., the requesting transaction database state).

In some embodiments, database management system 102 may use implied constraint 306 to perform query optimization. For example, database management system 102 may use implied constraint 306 to skip (e.g., prune) an associated partition 108 during dynamic partition pruning.

For example, in some embodiments, a database administrator may define an implied constraint 306 as a minimum and maximum value pair for a column (e.g., column 202) in the associated partition 108 in database table 106. This minimum and maximum value pair may represent the smallest and the largest values that appear in column 202 in the associated partition 108 of database table 106. In some embodiments, database management system 102 may build and manage constraint data statistics object 302. As a result, database management system 102 may ensure that implied constraint 306 is dynamically updated when the data in database table 106 is changed.

In some embodiments, database management system 102 may skip (e.g., prune) the associated partition 108 based on a query predicate excluding the range of the minimum and maximum values of the associated partition 108 for column 202 based on the implied constraint 306. In other words, database management system 102 may perform dynamic partition pruning at runtime. This is different than static partition pruning because the pruning is based on the current data in an associated partition, as well as the data state.

Figure 4:
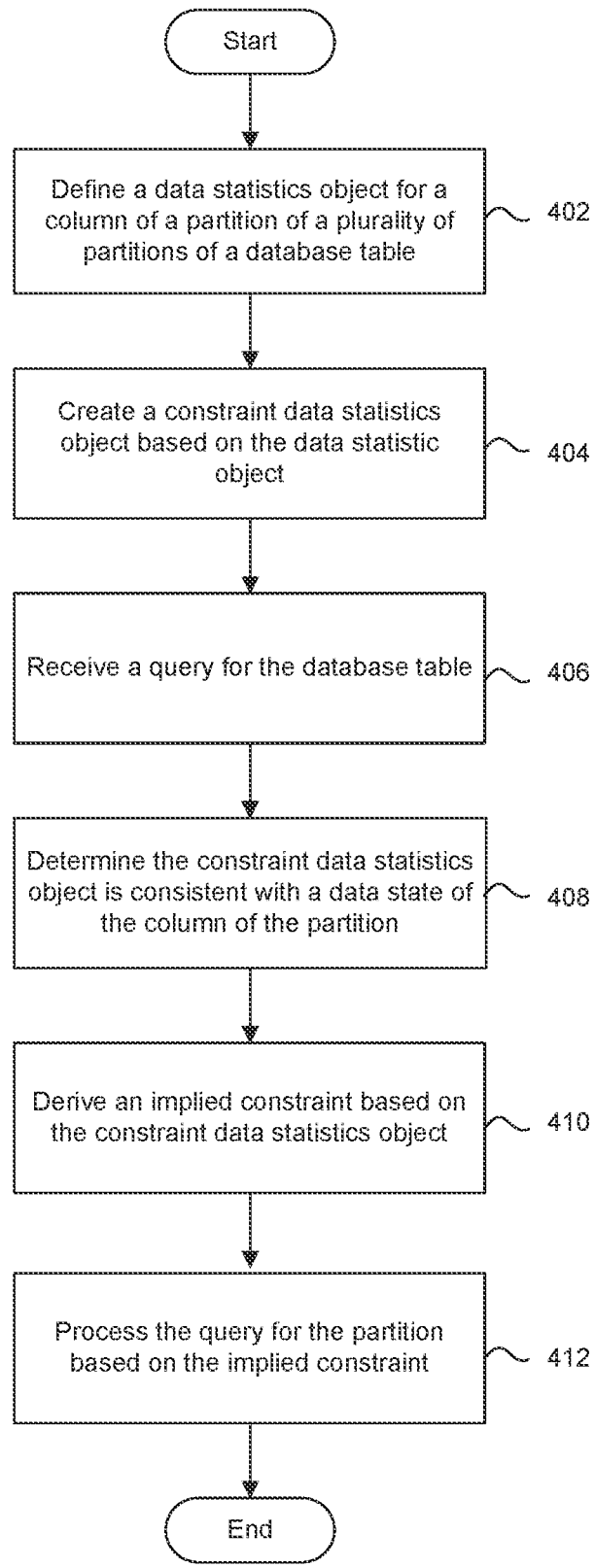
FIG. 4 is a flowchart illustrating a process for using traditional data statistics objects as dynamic data integrity constraints, according to some embodiments.

FIG. 4 is a flowchart for a method 400 for using traditional data statistics objects as dynamic data integrity constraints, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

In 402, database management system 102 defines a data statistics object for a column of a partition or a plurality of partitions of a database table. In some embodiments, database management system 102 may define the data statistics object as a minimum and maximum value pair for the column of the partition of the database table. As would be appreciated by a person of ordinary skill in the art, database management system 102 may define the data statistics object based on various other types of statistical functions. In some embodiments, database management system 102 may build and manage the data statistics object.

In 404, database management system 102 creates a constraint data statistics object based on the data statistic. In some embodiments, the constraint data statistics object may be a special type of data statistics object.

In 406, database management system 102 receiving a query for the database table. In some embodiments, the query may be a selection query, insertion query, modification query, or deleting query. In some embodiments, the query may be a Structured Query Language (SQL) query.

In 408, database management system 102 determines whether a constraint data statistics object is consistent with a data state of the column of the partition. In some embodiments, database management system 102 may determine the constraint data statistics object is consistent with the data state of the column of the partition using consistency metadata in the constraint data statistics object. In some embodiments, for example, the consistency metadata may be the associated MaxRowID value.

In 408, database management system 102 derives an implied integrity constraint based on the constraint data statistics object. For example, database management system 102 may derive the implied integrity constraint based on the statistical value being tracked in the constraint data statistics object (e.g., the minimum and maximum value pair for the column of the partition of the database table).

In 410, database management system 102 processes the query for the partition based on the implied constraint. For example, database management system 102 may perform dynamic partition pruning for the query based on the implied constraint. As would be appreciated by a person of ordinary skill in the art, database management system 102 may perform query transformation, runtime optimizations, and semi-join reduction, or various other types of operations (including query optimization steps) for the query based on the implied constraint.

Figure 5:
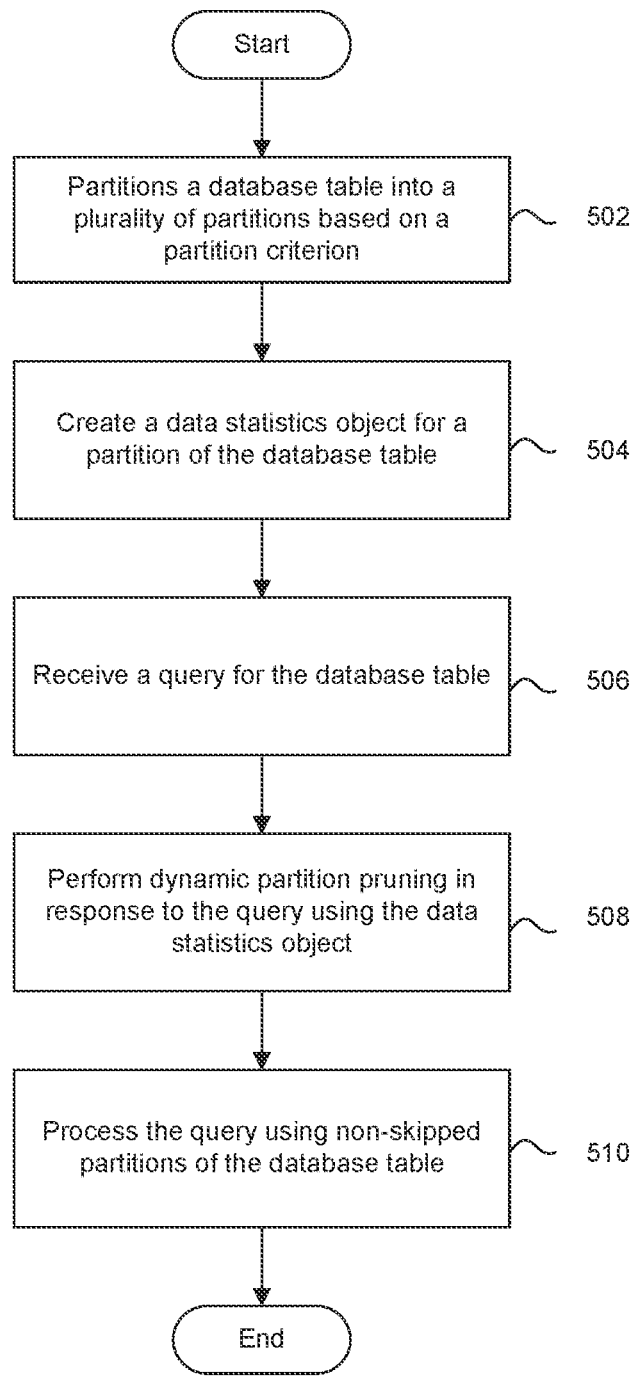
FIG. 5 is a flowchart illustrating a process for dynamic partition pruning using data statistics objects as data integrity constraints, according to some embodiments.

FIG. 5 is a flowchart for a method 500 for a dynamic partition pruning process that uses data statistics objects as data integrity constraints, according to some embodiments. As would be appreciated by a person of ordinary skill in the art, method 500 may involve other query optimization processes including, but not limited to, query transformation, runtime optimizations, and semi-join reduction that may be performed using data statistics objects as data integrity constraints. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

In 502, database management system 102 partitions a database table into a plurality of partitions based on a partition criterion. In some embodiments, database management system 102 may store the partitions on the same physical database node. In some other embodiments, database management system 102 may store the partitions across several database nodes. In some embodiments, database management system 102 may age the database table by partitioning the database table into a plurality of physically independent partitions using range partitioning or various other partitioning criterion as would be appreciated by a person of ordinary skill in the art. For example, database management system 102 may partition an ORDERS database table into hot partition containing orders from the last two years, and one or more cold partitions that each contain the orders for a single calendar year.

In 504, database management system 102 creates a data statistics object for a partition of the database table. In some embodiments, database management system 102 creates the data statistics object for a column of the partition of the database table. In some other embodiments, database management system 102 may create the data statistics object for a row of the partition of the database table. In some embodiments, the data statistics object is a constraint data statistics object that includes consistency metadata and an implied constraint. In some embodiments, the consistency metadata may be a MaxRowID value. The MaxRowID value may represent a state of a partition of the database table. The MaxRowID may store the maximum row identifier value for the partition when the data statistics object was created or last updated. The constraint may represent a dynamic data integrity constraint. For example, in some embodiments, the implied integrity constraint may be a minimum and maximum value pair for a column of a partition of the database table.

In 506, database management system 102 receives a query for the database table;

In 508, database management system 102 determines that the data statistics object is consistent. In some embodiments, database management system 102 may compare the MaxRowID value in the data statistic object's consistency metadata to the MaxRowId value of a partition of the database table, when the query is being processed. Database management system 102 may determine that the data statistics object is consistent if the MaxRowID value in the data statistics object's consistency metadata is equal to the MaxRowId value of the partition.

In 510, database management system 102 performs dynamic partition pruning in response to the query using the data statistics object. In some embodiments, database management system 102 may skip loading and scanning a partition of the database table during query processing if values satisfying a predicate for the query does not satisfy the data statistics object's implied constraint. For example, in some embodiments, database management system 102 may compare the values satisfying the predicate of the query to the minimum and maximum value pair of the data statistics object. Database management system 102 may skip loading and scanning a partition if none of the values satisfying the predicate of the query is within the minimum and maximum value range of the data statistics object.

In 512, database management system 102 processes the query using non-skipped partitions of the database table.

Figure 6:
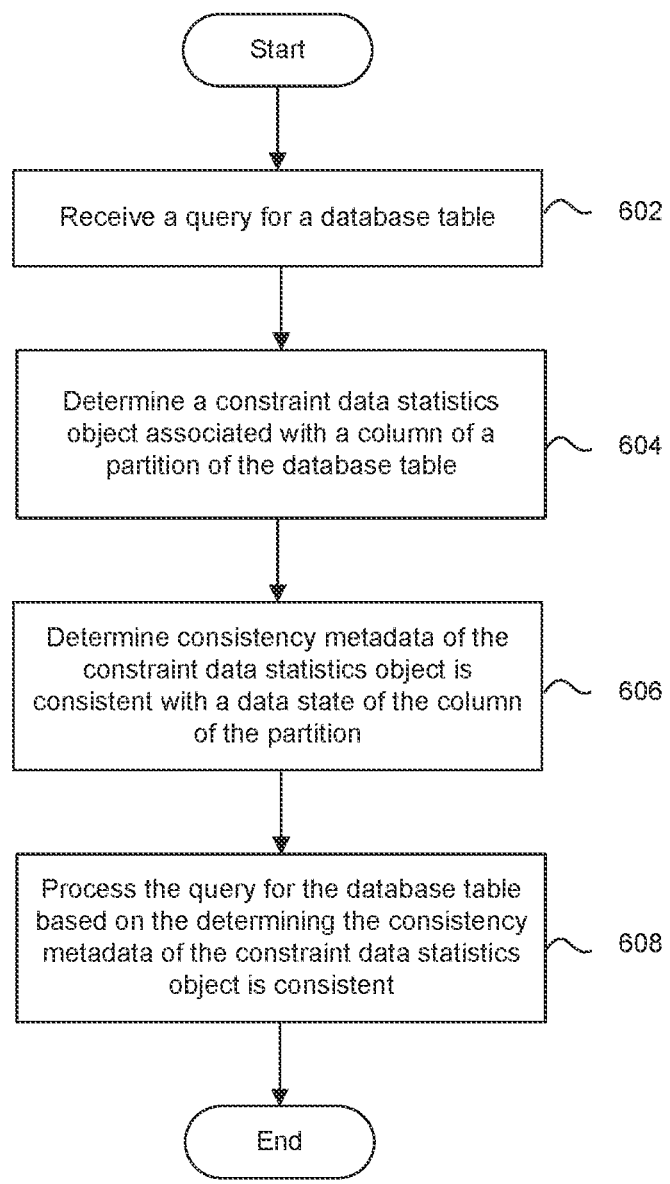
FIG. 6 is a flowchart illustrating a process for performing consistency checking of constraint data statistics objects, according to some embodiments.

FIG. 6 is a flowchart for a method 600 for performing consistency checking of constraint data statistics objects, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

In 602, database management system 102 receives a query for a database table. In some embodiments, the query may a selection query, insertion query, modification query, or deleting query. In some embodiments, the query may be a Structured Query Language (SQL) query.

In 604, database management system 102 determines a constraint data statistics object associated with a column of a partition of the database table.

In 606, database management system 102 determines consistency metadata of the constraint data statistics object is consistent with a data state of the column of the partition of the database table.

In 608, database management system 102 processes the query for the database table based on determining the consistency metadata of the constraint data statistics object is consistent with the data state of the column of the partition of the database table. In some embodiments, database management system 102 may determine the constraint data statistics object is consistent with the data state of the column of the partition using the MaxRowID value of the consistency metadata in the constraint data statistics object.

Various embodiments can be implemented, for example, using one or more computer systems, such as computer system 700 shown in FIG. 7. Computer system 700 can be used, for example, to implement method 400 of FIG. 4. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for using data statistics as dynamic data integrity constraints, comprising:
   creating, by at least one processor of a database management system (DBMS), a constraint data statistics object, wherein the constraint data statistics object stores and tracks a single data statistic of a single database object, the constraint data statistics object stores consistency metadata that specifies a most recent time point when the single database object was created or last updated, and the DBMS is configured to automatically update the constraint data statistics object in response to a data change being made to the single database object;
   receiving, by the at least one processor, a query referencing the single database object;
   in response to receiving the query, determining, by the at least one processor, the single data statistic stored in the constraint data statistics object reflects a current data state of the single database object using the consistency metadata;
   deriving, by the at least one processor, a dynamic data integrity constraint for the single database object from the single data statistic stored in the constraint data statistics object in response to the determining, wherein the dynamic data integrity constraint defines a condition for inclusion of data in the single database object; and
   executing, by the at least one processor, the query for the single database object according to the dynamic data integrity constraint for the single database object, thereby producing a result, wherein the executing comprises comparing a predicate of the query against the condition of the dynamic data integrity constraint for the single database object.

2. The computer-implemented method of claim 1, further comprising:
   updating the single data statistic stored in the constraint data statistics object based on the current data state of the single database object.

3. The computer-implemented method of claim 1, the determining further comprising:
   comparing the consistency metadata to the current data state of the single database object.

4. The computer-implemented method of claim 1, the determining further comprising:
   determining a database snapshot associated with the query.

5. The computer-implemented method of claim 1, the creating further comprising:
   defining the single data statistic stored in the constraint data statistics object for a column or a set of columns of the single database object.

6. The computer-implemented method of claim 1, the executing further comprising:
   performing at least one of dynamic partition pruning, query optimization, semi-join reduction optimization, or query transformation.

7. The computer-implemented method of claim 1, the executing further comprising:
   skipping a portion of the single database object based on the predicate of the query being disjoint with the condition of the dynamic data integrity constraint for the single database object.

8. A system, comprising:
   a memory; and
   at least one processor coupled to the memory and configured to:
      create a constraint data statistics object, wherein the constraint data statistics object stores and tracks a single data statistic of a single database object, the constraint data statistics object stores consistency metadata that specifies a most recent time point when the single database object was created or last updated, and the at least one processor is configured to automatically update the constraint data statistics object in response to a data change being made to the single database object;
      receive a query referencing the single database object;
      in response to receiving the query, determine the single data statistic stored in the constraint data statistics object reflects a current data state of the single database object using the consistency metadata;
      derive a dynamic data integrity constraint for the single database object from the single data statistic stored in the constraint data statistics object in response to the determining, wherein the dynamic data integrity constraint defines a condition for inclusion of data in the single database object; and
      execute the query for the single database object according to the dynamic data integrity constraint for the single database object, thereby producing a result, wherein the executing comprises comparing a predicate of the query against the condition of the dynamic data integrity constraint for the single database object.

9. The system of claim 8, wherein the at least one processor is further configured to:
update the single data statistic stored in the constraint data statistics object based on the current data state of the single database object.

10. The system of claim 8, wherein to determine the single data statistic stored in the constraint data statistics object reflects the current data state of the single database object, the at least one processor is further configured to:
compare the consistency metadata to the current data state of the single database object.

11. The system of claim 8, wherein to determine the single data statistic stored in the constraint data statistics object reflects the current data state of the single database object, the at least one processor is further configured to:
determine a database snapshot associated with the query.

12. The system of claim 8, wherein to create the constraint data statistics object, the at least one processor is further configured to:
define the single data statistic stored in the constraint data statistics object for a column or a set of columns of the single database object.

13. The system of claim 8, wherein to execute the query, the at least one processor further is configured to:
perform at least one of dynamic partition pruning, query optimization, semi-join reduction optimization, or query transformation.

14. The system of claim 8, wherein to execute the query, the at least one processor further configured to:
skip a portion of the single database object based on the predicate of the query being disjoint with the condition of the dynamic data integrity constraint for the single database object.

15. A non-transitory computer-readable medium having instructions stored thereon that, when executed by at least one computing device, cause the at least one computing device to perform operations comprising:
creating a constraint data statistics object, wherein the constraint data statistics object stores and tracks a single data statistic of a single database object, the constraint data statistics object stores consistency metadata that specifies a most recent time point when the single database object was created or last updated, and the at least one computing device is configured to automatically update the constraint data statistics object in response to a data change being made to the single database object;
receiving a query referencing the single database object;
in response to receiving the query, determining the single data statistic stored in the constraint data statistics object reflects a current data state of the single database object using the consistency metadata;
deriving a dynamic data integrity constraint for the single database object from the single data statistic stored in the constraint data statistics object in response to the determining, wherein the dynamic data integrity constraint defines a condition for inclusion of data in the single database object; and
executing the query for the single database object according to the dynamic data integrity constraint for the single database object, thereby producing a result, wherein the executing comprises comparing a predicate of the query against the condition of the dynamic data integrity constraint for the single database object.

16. The non-transitory computer-readable medium of claim 15, the operations further comprising:
updating the single data statistic stored in the constraint data statistics object based on the current data state of the single database object.

17. The non-transitory computer-readable medium of claim 15, the determining further comprising:
comparing the consistency metadata to the current data state of the single database object.

18. The non-transitory computer-readable medium of claim 15, the determining further comprising:
determining a database snapshot associated with the query.

19. The non-transitory computer-readable medium of claim 15, the creating further comprising:
defining the single data statistic stored in the constraint data statistics object for a column or a set of columns of the single database object.

20. The non-transitory computer-readable medium of claim 15, the executing further comprising:
performing at least one of dynamic partition pruning, query optimization, semi-join reduction optimization, or query transformation.

* * * * *